(12) United States Patent
Gilmore et al.

(10) Patent No.: US 10,527,128 B2
(45) Date of Patent: Jan. 7, 2020

(54) METHOD FOR DYNAMICALLY BALANCING AN ARTICLE AND DYNAMICALLY BALANCED ARTICLE

(71) Applicant: American Axle & Manufacturing, Inc., Detroit, MI (US)

(72) Inventors: Curt D. Gilmore, Fenton, MI (US); Holly A. Giangrande, Troy, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 182 days.

(21) Appl. No.: 15/665,466

(22) Filed: Aug. 1, 2017

(65) Prior Publication Data

US 2018/0045272 A1    Feb. 15, 2018

Related U.S. Application Data

(60) Provisional application No. 62/374,111, filed on Aug. 12, 2016.

(51) Int. Cl.
*F16F 15/32* (2006.01)
*F16F 15/36* (2006.01)

(52) U.S. Cl.
CPC .......... *F16F 15/322* (2013.01); *F16F 15/366* (2013.01); *F16F 2232/02* (2013.01)

(58) Field of Classification Search
None
See application file for complete search history.

(56) References Cited

U.S. PATENT DOCUMENTS

| | | | |
|---|---|---|---|
| 4,895,551 A * | 1/1990 | Fritz | F16C 3/026 464/180 |
| 6,334,568 B1 | 1/2002 | Seeds | |
| 7,997,989 B2 | 8/2011 | Friedman | |
| 8,056,410 B2 | 11/2011 | Sanchez et al. | |
| 9,772,004 B1 | 9/2017 | Stuart et al. | |
| 2012/0100299 A1* | 4/2012 | Zajchowski | C23C 28/321 427/446 |
| 2017/0292380 A1* | 10/2017 | Diwinsky | F01D 25/285 |

OTHER PUBLICATIONS

"An Introduction to Thermal Spray", Orelikon Metco, Jul. 2016.
U.S. Appl. No. 15/228,269, Gilmore et al.
U.S. Appl. No. 15/402,555, Charles G. Stuart.

* cited by examiner

*Primary Examiner* — Paul M. West
*Assistant Examiner* — Mark A Shabman
(74) *Attorney, Agent, or Firm* — Harness, Dickey & Pierce, P.L.C.

(57) ABSTRACT

A method for dynamically balancing an unbalanced article about a rotary axis. The method includes determining a mass and a position of a corrective weight, the mass and position of the corrective weight being configured to at least partly correct an imbalance in the unbalanced article that is generated when the unbalanced article is rotated about the rotary axis; and spraying an atomized liquid or molten material toward a surface of the unbalanced article to form the corrective weight.

6 Claims, 2 Drawing Sheets

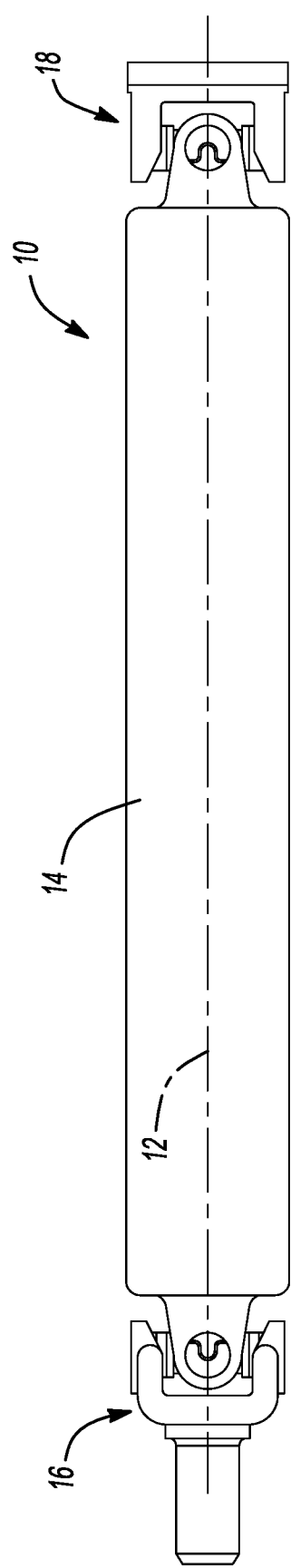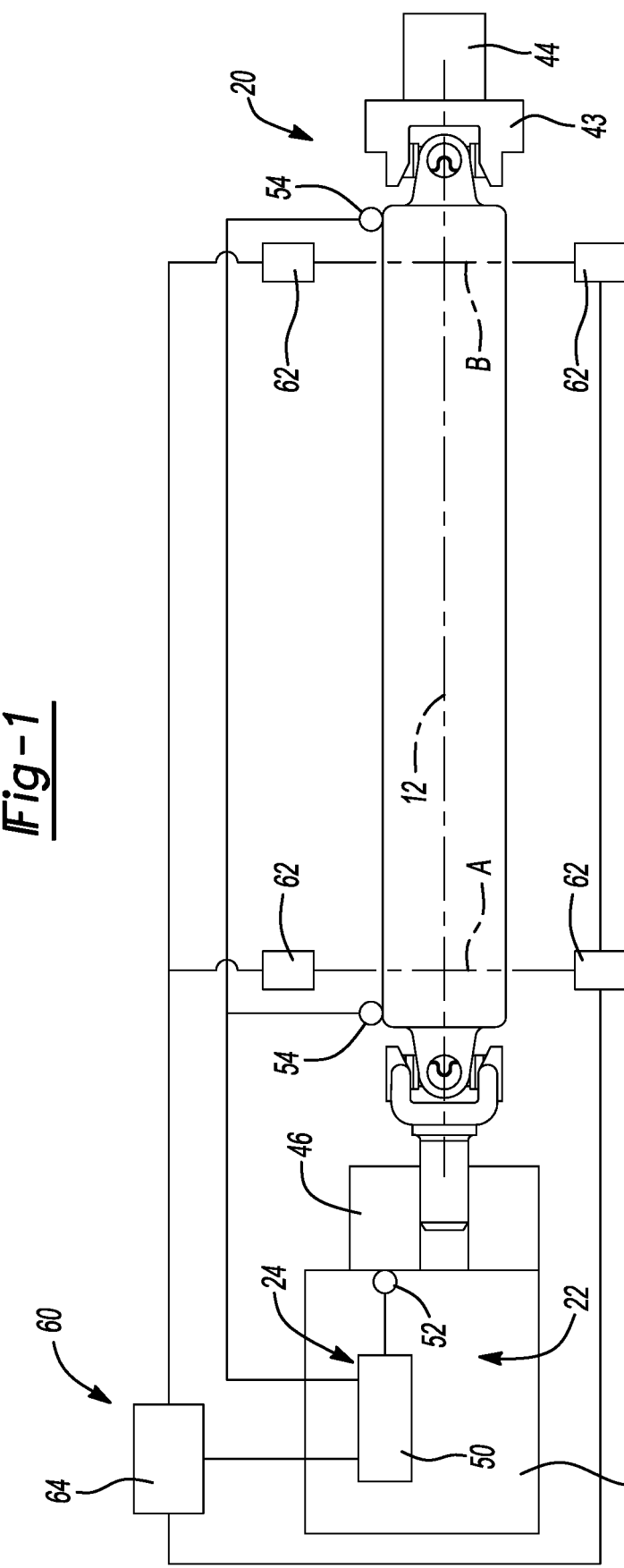

METHOD FOR DYNAMICALLY BALANCING AN ARTICLE AND DYNAMICALLY BALANCED ARTICLE

CROSS-REFERENCE TO RELATED APPLICATIONS

This application claims the benefit of U.S. Provisional Patent Application No. 62/374,111 filed Aug. 12, 2016, the disclosure of which is incorporated by reference as if fully set forth in detail herein.

FIELD

The present disclosure relates to a method for dynamically balancing an article and a related dynamically balanced article.

BACKGROUND

In the manufacture of high-speed power transmitting shafts for use in vehicle drivelines, it is common practice to dynamically balance the shaft within predefined limits so that unwanted vibration is not produced during high-speed rotation of the shaft. Dynamic balancing is typically performed by securing a balance weight to targeted area of an unbalanced shaft to create a counter-imbalance that substantially or completely cancels out the imbalance present in the unbalanced shaft.

Modernly, balance weights are secured to the shaft using a welding technique (e.g., resistance welding). The welding technique, however, produces a heat-affected zone that can reduce the fatigue strength of the shaft. Alternatives to weld-secured balance weights, such as balance weights secured by adhesive materials or a technique that involves removal of material from a selected area of the unbalanced shaft, have been suggested, but such techniques are significantly slower than a balancing process that secures balance weights via welding. This is significant because the equipment that is employed to balance such shafts (at modern automotive volumes) is extremely expensive. Consequently, a relatively slower method of balancing an unbalanced shaft is not desirable, not only due to increased labor costs, but also because such methods reduce the efficiency and through-put of the balancing operation, rendering it more likely that one or more additional balancing machines would be required to maintain desired production levels.

SUMMARY

This section provides a general summary of the disclosure, and is not a comprehensive disclosure of its full scope or all of its features.

In one form, the present teachings provide a method for dynamically balancing an unbalanced article about a rotary axis. The method includes determining a mass and a position of a corrective weight, the mass and position of the corrective weight being configured to at least partly correct an imbalance in the unbalanced article that is generated when the unbalanced article is rotated about the rotary axis; and spraying an atomized liquid or molten material toward a surface of the unbalanced article to form the corrective weight that is fixedly coupled to the unbalanced article.

In a further form, the unbalanced article is rotating about the rotary axis as the atomized liquid or molten material is sprayed toward the surface of the unbalanced article.

In a further form, the atomized liquid or molten material comprises a plasma.

In a further form, the atomized liquid or molten material at least partly solidifies before impacting the unbalanced article. Optionally, the sprayed atomized liquid or molten material forms discrete particles that bond to one another via mechanical hooking.

In another form, the present teachings provide a rotationally balanced article that includes an unbalanced article and a balance weight. The unbalanced article has a rotational imbalance when the unbalanced article is rotated about a predefined rotary axis. The balance weight is mechanically adhered to the unbalanced article. The balance weight has a mass and is positioned on the unbalanced article at a location that at least partly attenuates the rotational imbalance. The balance weight and the portion of the unbalanced article to which the balance weight is mechanically adhered are formed of a plurality of discrete particles that have accumulated and interlocked on the unbalanced article. The rotationally balanced article does not have any heat-affected zones where the balance weight is mechanically adhered to the unbalanced article.

In a further form, the discrete particles are formed of metal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a front elevation view of an exemplary unbalanced shaft;

FIG. 2 is a schematic top plan view of the unbalanced shaft of FIG. 1 mounted in a dynamic balancing machine proximate a balance weight application machine constructed in accordance with the teachings of the present disclosure;

Corresponding reference numerals indicate corresponding parts throughout the several views of the drawings.

DETAILED DESCRIPTION

Figure 3:
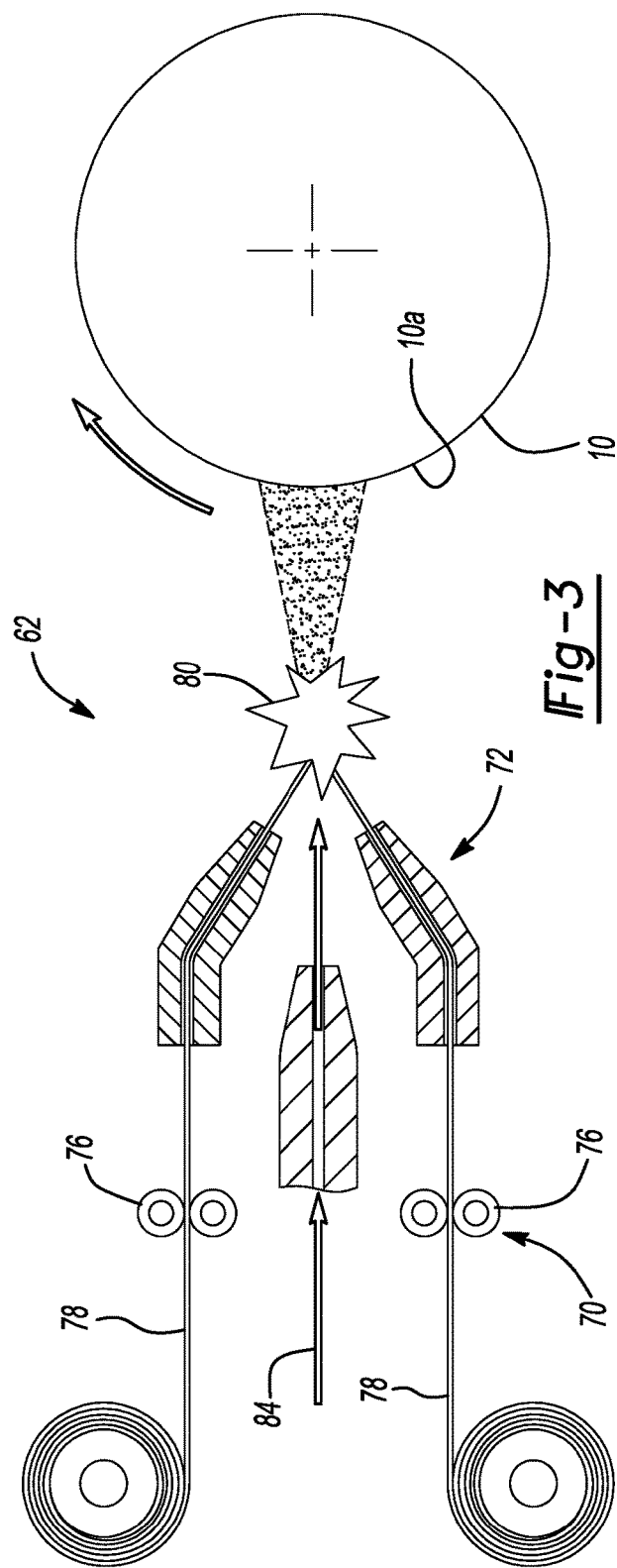
FIG. 3 is a schematic view of a portion of the balance weight application machine depicting an exemplary spray applicator.

In FIG. 1, an exemplary unbalanced shaft assembly is generally indicated by reference numeral 10. The unbalanced shaft 10 is depicted as being an automotive propshaft, but it will be appreciated that the teachings of the present disclosure could be applicable to the dynamic balancing of any rotating/rotatable article. As used herein, the term "dynamic balancing" will be understood to mean alignment of the central axis of inertia of the unbalanced shaft 10 to a predetermined rotational axis 12. The unbalanced shaft 10 can include a tubular segment 14, and first and second cardan joints 16 and 18, respectively, that can be constructed and coupled to the tubular segment 14 in a conventional and well known manner. The tubular segment 14 can be formed of an appropriate metal, such as steel or aluminum.

In FIG. 2, the unbalanced shaft 10 is inserted into a dynamic balancing machine 20 having a shaft holding portion 22 and an imbalance detection portion 24. The shaft holding portion 22 can be constructed in a conventional and well known manner is configured to both hold and rotate the unbalanced shaft 10. In the example provided, the shaft holding portion 22 includes a frame (not specifically shown), a motor-driven (live) spindle 42, a rotatable (dead) spindle 44, a first holding fixture 46, and a second holding fixture 48. The frame can house the motor that drives the live spindle 42. The live spindle 42 can be fixedly mounted to the frame, while the dead spindle 44 can be movably mounted the frame. In the example provided, the frame includes a set of ways (not shown) on which the dead spindle 44 can be slidably mounted. The first holding fixture 46 can be coupled to the live spindle 42 for rotation therewith, while the second holding fixture 48 and be coupled to the dead spindle 44 for rotation therewith. The first holding fixture 46 can be configured to fixedly but releasably engage the first cardan joint 16, while the second holding fixture 48 can be configured to fixedly but releasably engage the second cardan joint 18. The live spindle 42 and the dead spindle 44 cooperate to define a rotational axis 12, while the first and second holding fixtures 46 and 48 cooperate to align the unbalanced shaft 10 to the rotational axis 12.

The imbalance detection portion 24 is conventional in its construction and operation and is configured to identify locations of imbalance at pre-selected locations on the unbalanced shaft 10 along the rotational axis 12. In brief, the imbalance detection portion 24 includes a controller 50 as well as a plurality of sensors, including one or more sensors 54 that are configured to sense force generated by the unbalanced shaft 10 as it is rotated about the rotational axis 12 and responsively generate associated force signals, was well as a rotational position sensor 52 that senses a rotational position of the live spindle 42 and responsively generates a rotational position signal. The controller 50 receives the force signal(s) and the rotational position signal and determines the magnitude of the mass of one or more corrective weights, as well as the placement of each corrective weight. The corrective weights are to be coupled to the unbalanced shaft 10 as detailed below to reduce or eliminate the dynamic imbalance. It will be appreciated that the placement of a corrective weight includes not only the pre-selected location along the rotational axis 12, but also a rotational position around the circumference of the unbalanced shaft 10.

A balance weight application machine 60 can be coupled to the frame of the dynamic balancing machine 20 and can include one or more spray applicators 62 and a control unit 64. With additional reference to FIG. 3, each spray applicator 62 can include a material feed portion 70 and a material spray portion 72. The material feed portion 70 can be configured to feed a material, such as a metal wire or a powered material (e.g., a powdered metal or ceramic material), into the material spray portion 72. In the example provided, the material feed portion 70 includes a pair of wire feeders 76 that feed respective wires 78 into the material spray portion 72. The material spray portion 72 is configured to convert the fed material (i.e., wire in the example provided) into a liquid or molten material, such as a plasma 80, atomize the liquid or molten material and direct the atomized liquid or molten material onto a surface 10a of the unbalanced shaft 10 via a pressurized gas (represented by arrow 84), such as compressed air. The material feed portion 70 and the material spray portion 72 are commercially available from equipment manufacturers such as Sulzer Metco (US), Inc. (a division of Oerlikon Metco), 1101 Prospect Ave., Westbury, N.Y. It will be appreciated that the density of the material that is fed via the material feed portion 70 into the material spray portion 72 can have any desired density (i.e., a density less than, equal to or greater than a density of the tubular shaft 14). Preferably, the material that is fed via the material feed portion 70 into the material spray portion 72 has a density that is greater than the density of the tubular shaft 14.

Returning to FIG. 2, the balance weight application machine 60 of the particular example provided includes two pair (i.e., a total quantity of four) of spray applicators 62, with each pair of spray applicators 62 being disposed at a common one of the pre-selected locations (designated by reference characters A & B) along the rotational axis 12 and circumferentially spaced apart from one another by a pre-determined amount around the rotational axis 12, such as 180 degrees. It will be appreciated that multiple spray applicators 62 are employed in the example provided to reduce the cycle time for balancing the unbalanced shaft 10, and that fewer spray applicators 62 could be employed if desired. For example, a single spray applicator 62 could be employed, and if balance weights were required at multiple pre-selected locations along the rotational axis 12, a positioning device (not shown) could be employed to couple the spray applicator 62 to the frame. The positioning device could comprise, for example, a ball screw that could be employed to accurately position the spray applicator 62 along the rotational axis 12.

The control unit 64 can be a discrete controller or can be integrated into the controller 50 of the imbalance detection portion 24 of the dynamic balancing machine 20 and is configured to coordinate the operation of the spray applicator(s) 62. As used herein, the term controller refers to an application specific integrated circuit (ASIC), an electronic circuit, a processor (shared, dedicated or group) and memory that executes one or more software or firmware programs, a combinational logic circuit, or other suitable components that provide the described functionality. The control unit 64 can receive information from the controller 50 for the corrective weight(s) and can responsively coordinate operation of the spray applicators 62. More specifically, the control unit 64 controls the spray applicators 62 to coordinate the deposit of material onto the surface of the unbalanced shaft 10 to form each of the corrective weights that are needed to dynamically balance the unbalanced shaft 10. In one form, the control unit 64 controls the spray applicators 62 so that they operate on an intermittent basis while the unbalanced shaft 10 is rotated so as to create each of corrective weights at their respective predetermined (axial) location, determined circumferential position and with the determined mass. Alternatively, rotation of the unbalanced shaft 10 can be halted while a given one of the spray applicators 62 is operated to form one of the corrective weights. The material dispensed by the spray applicators 62 (i.e., a plurality of discrete particles) mechanically adheres to and accumulates on the unbalanced shaft 10 so that the balance weights are formed and secured to the unbalanced shaft 10 without creating a heat-affected zone in the tubular shaft 14.

Figure 4:
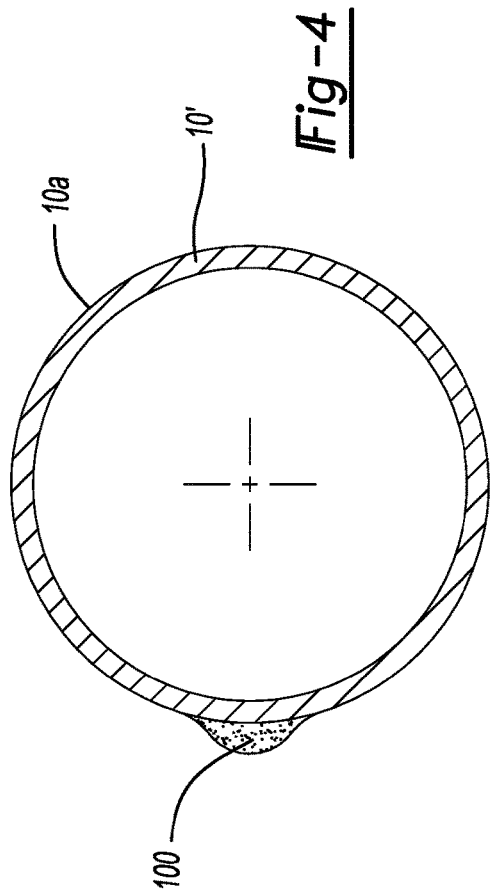
FIG. 4 is a section view of a dynamically balanced shaft that is formed by generating and securing one or more balance weights to an unbalanced shaft.

FIG. 4 is a cross-sectional view depicting one of the corrective weights 100 as formed on and coupled to the outer circumferential surface 10a. It will be appreciated that the formation and coupling of the corrective weights to the unbalanced shaft 10 (FIG. 1) forms a balanced shaft 10'.

While the balance weight application machine 60 has been described as including electric arc wire spray applicators having a material feed portion 70 with a wire feeder that is configured to feed a metal wire into a material spray portion 72 that converts the metal wire into a plasma, atomizes the plasma and directs the atomized plasma toward the unbalanced shaft 10 in a desired manner, it will be appreciated that the spray applicators 62 could be configured as conventional flame spray applicators, high-velocity oxyfuel spray applicators and/or plasma spray applicators. Moreover, the material that is employed to form the corrective weight can be a non-metallic material, such as a ceramic material, that does not decompose as it is melted. Accordingly, it will be appreciated that the spray applicators 62 are configured to produce a thermal spray in which molten or melted spray material is propelled at high speed onto a target work surface of a workpiece, that heat from the particles that accumulate on the work piece is transferred through the work surface to the workpiece, and that particles that accumulate on the workpiece accumulate, shrink and solidify, so that they are bonded or adhered to one another and the workpiece via mechanical hooking (i.e., interlocking of the particles into surface irregularities).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for dynamically balancing an unbalanced article about a rotary axis, the method comprising:

determining a mass and a position of a corrective weight, the mass and position of the corrective weight being configured to at least partly correct an imbalance in the unbalanced article that is generated when the unbalanced article is rotated about the rotary axis;

rotating the unbalanced article; and intermittently spraying an atomized liquid or molten material toward a surface of the unbalanced article while the unbalanced article is rotating to form the corrective weight that is fixedly coupled to the unbalanced article.

2. The method of claim 1, wherein the atomized liquid or molten material comprises a plasma.

3. The method of claim 1, wherein the atomized liquid or molten material at least partly solidifies before impacting the unbalanced article.

4. The method of claim 3, wherein the sprayed atomized liquid or molten material forms discrete particles that bond to one another via mechanical hooking.

5. A rotationally balanced article comprising:

an unbalanced article having a rotational imbalance when the unbalanced article is rotated about a predefined rotary axis; and a balance weight that is mechanically adhered to the unbalanced article, the balance weight having a mass and being positioned on the unbalanced article at a location that at least partly attenuates the rotational imbalance;

wherein the balance weight is formed of a plurality of discrete particles that have accumulated on the unbalanced article and interlocked to the unbalanced article and one another, and wherein the rotationally balanced article does not have any heat-affected zones where the balance weight is mechanically adhered to the unbalanced article.

6. The rotationally balanced article of claim 5, wherein the discrete particles are formed of metal.

* * * * *